US007182692B2

(12) United States Patent
Parrott et al.

(10) Patent No.: US 7,182,692 B2
(45) Date of Patent: Feb. 27, 2007

(54) GAMING MACHINE WITH SCANNING CAPABILITY

(75) Inventors: Gregory Parrott, Reno, NV (US); Franco Crivelli, Reno, NV (US)

(73) Assignee: IGT, Reno, NV (US)

( * ) Notice: Subject to any disclaimer, the term of this patent is extended or adjusted under 35 U.S.C. 154(b) by 714 days.

(21) Appl. No.: 10/423,178

(22) Filed: Apr. 25, 2003

(65) Prior Publication Data

US 2004/0214643 A1 Oct. 28, 2004

(51) Int. Cl.
*A63F 13/00* (2006.01)

(52) U.S. Cl. .......................................................... 463/43

(58) Field of Classification Search ............ 463/30–31, 463/42–43, 29
See application file for complete search history.

(56) References Cited

U.S. PATENT DOCUMENTS

| | | | | |
|---|---|---|---|---|
| 6,142,876 | A | 11/2000 | Cumbers | 463/25 |
| 6,176,429 | B1 | 1/2001 | Reddersen et al. | 235/462.25 |
| 6,234,900 | B1 | 5/2001 | Cumbers | 463/29 |
| 6,364,765 | B1 | 4/2002 | Walker et al. | |
| 6,505,778 | B1 | 1/2003 | Reddersen et al. | 235/462.25 |
| 6,582,301 | B2 | 6/2003 | Hill | 463/11 |
| 2002/0169509 | A1* | 11/2002 | Huang et al. | 700/66 |

FOREIGN PATENT DOCUMENTS

| | | |
|---|---|---|
| WO | WO-02/30534 A1 | 4/2002 |
| WO | WO-03/046852 A2 | 6/2003 |

OTHER PUBLICATIONS

International Search Report for International Application No. PCT/US2004/010826 dated Aug. 31, 2004.
Written Opinion for International Application No. PCT/US2004/010826 dated Aug. 31, 2004.

* cited by examiner

*Primary Examiner*—Kim Nguyen
(74) *Attorney, Agent, or Firm*—Marshall. Gerstein & Borun LLP

(57) ABSTRACT

A gaming apparatus with a scanner is disclosed where a player can input an object into the scanner, view and modify the scan and take actions based on the scan.

51 Claims, 16 Drawing Sheets

FIG. 10
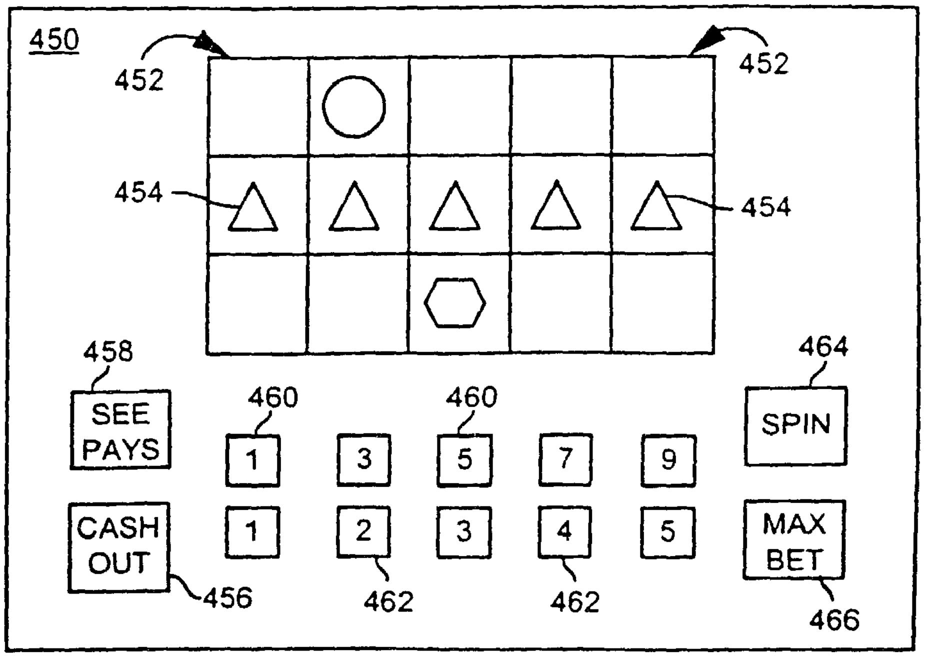
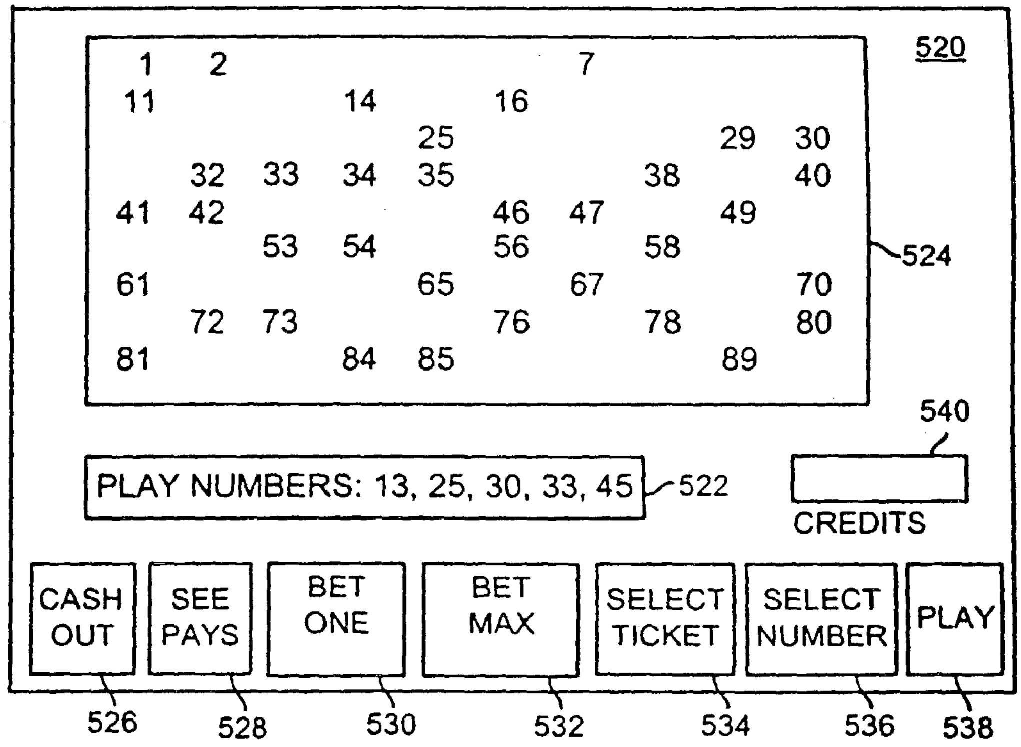
FIG. 11

GAMING MACHINE WITH SCANNING CAPABILITY

BACKGROUND

This patent application pertains generally to gaming equipment such as that found at casinos and more particularly, to new methods which casino patrons may use to interact with gaming apparatus for purposes of playing games conducted by the gaming apparatus, playing games conducted over a network connection and, for accessing casino services.

Present day casinos offer a large variety of games as well as customer services. In addition, casinos offer services and attractions to entice a wide spectrum of people to visit casinos including shows, concerts, circuses, shopping, aquariums, roller coasters, spas, sports, sporting events, restaurants, clubs and bars to name a few. To attend many of these attractions, reservations may be necessary. Making reservations may be a cumbersome task, such as requiring a patron to visit multiple locations in or outside the casino or requiring a patron to make numerous telephone calls to different numbers.

Betting on casino-wide games such as Bingo, Keno, and sports book also can be cumbersome and require a patron to visit several locations within a casino. These games typically involve multiple patrons at a casino, each betting on the same event. For example, hundreds of casino patrons may choose to bet on the outcome of the 'Super Bowl' or on the outcome of the 'house' Keno game run by the casino. To participate, patrons write on a coupon the outcome they predict will occur and the amount they are willing to bet. They then must submit the coupon to a casino attendant responsible for posting the patron's bet promptly or they must do so themselves, prior to the start of the event on which the patron has placed a bet. Attendants are also responsible for issuing receipts and manually paying the patrons who win their bets.

SUMMARY

According to one aspect of the disclosure, a gaming apparatus may have a display unit that is capable of generating video images, an input device and a controller operatively coupled to the display unit and the input device, where the controller may have a processor and a memory operatively coupled to said processor. The controller may be programmed to allow a person to insert an object into the input device, cause the input device to scan an image of the object, save the scan of the object to a memory, display the scan of the object, determine if the scan of the object is recognized, communicate to the player that the object is not recognized if the scan of the object is not recognized, allow the player to modify the scan of the object if the scan of the object is recognized, allow the player to approve the scan of the object if the scan of the object is recognized and store the scan of the object as approved by the player as an approved scan in a memory if the player approves the scan of the object.

According to another aspect, the object may be a preformatted bet slip, an unformatted bet slip, a preformatted keno form, a drivers license, a credit card or a casino membership benefit card. The controller may be programmed to recognize the object by comparing the scan of the object to an image of known state drivers license images or comparing the image of the scan to known bet paper.

Accordingly to yet another aspect, the controller may be programmed to submit a bet based on the approved scan, submit a player card application based on the approved scan, distribute player points to the player based on the approved scan, submit an entry into a keno game based on the approved scan, or place a sports book bet based on the approved scan.

The input device may be an optical scanner. The controller may execute an optical character recognition routine on the scan of the object where the controller may store characters recognized by the optical character routine in a memory. The controller may be programmed to compare the stored characters to a database to determine if the object is authorized. The controller may also be programmed to compare the stored characters to a database of authorized drivers license numbers or a database of authorized credit card numbers to determine if the object is authorized. The controller may be programmed to distinguish stored characters into first identification data and second identification data and the controller may be programmed to compare the first identification data and second identification data to a database to determine if the object is authorized.

In another aspect, the gaming apparatuses may be interconnected to form a network of gaming apparatuses and the gaming apparatuses may be interconnected via the Internet. Additional aspects of the invention are defined by the claims of this patent.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______ ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
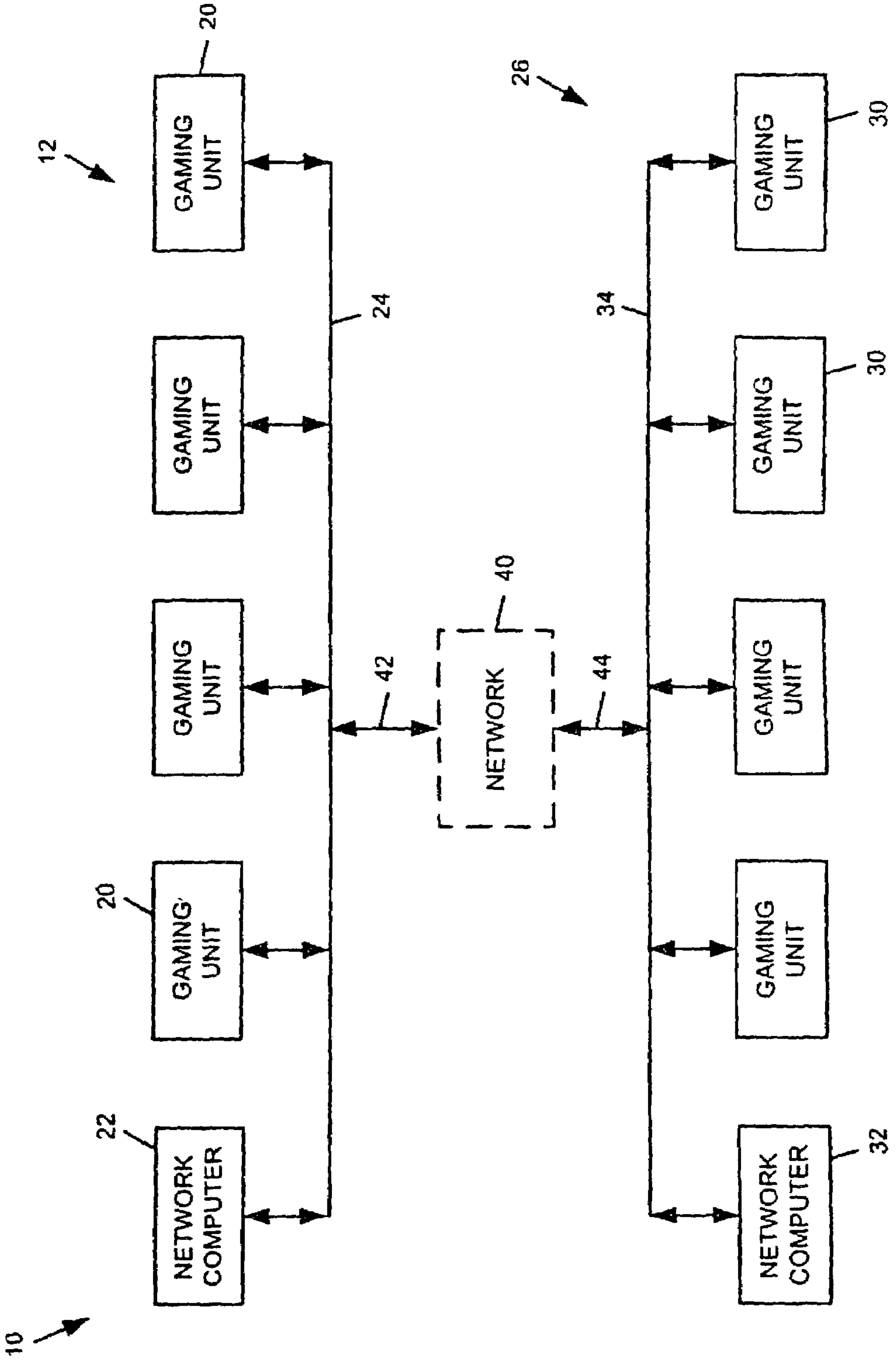
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
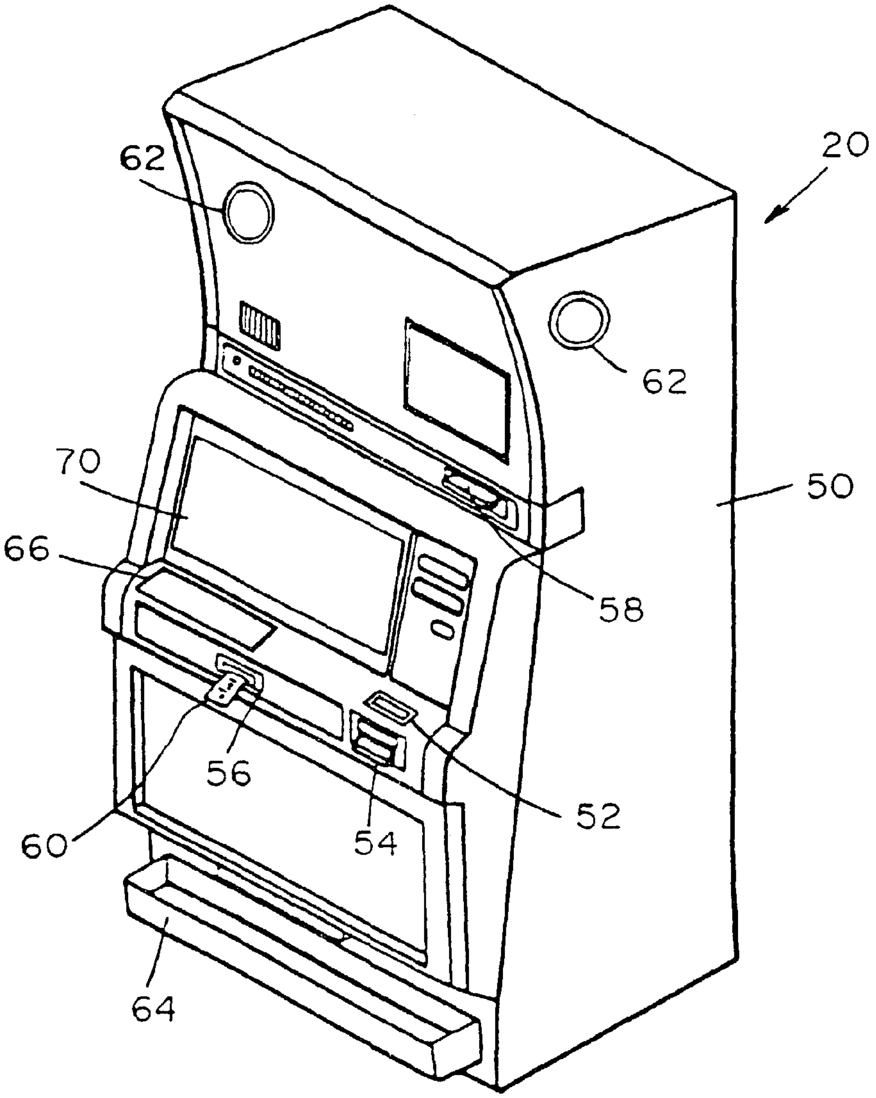
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data labeled user check-boxes, labeled user write-in boxes, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
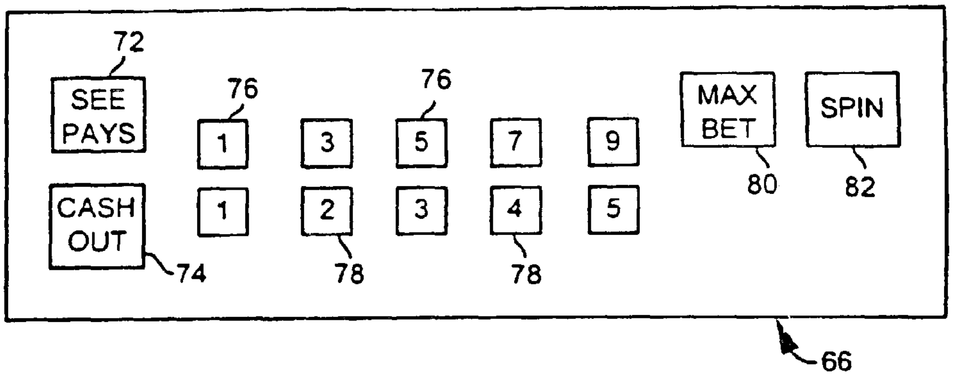
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
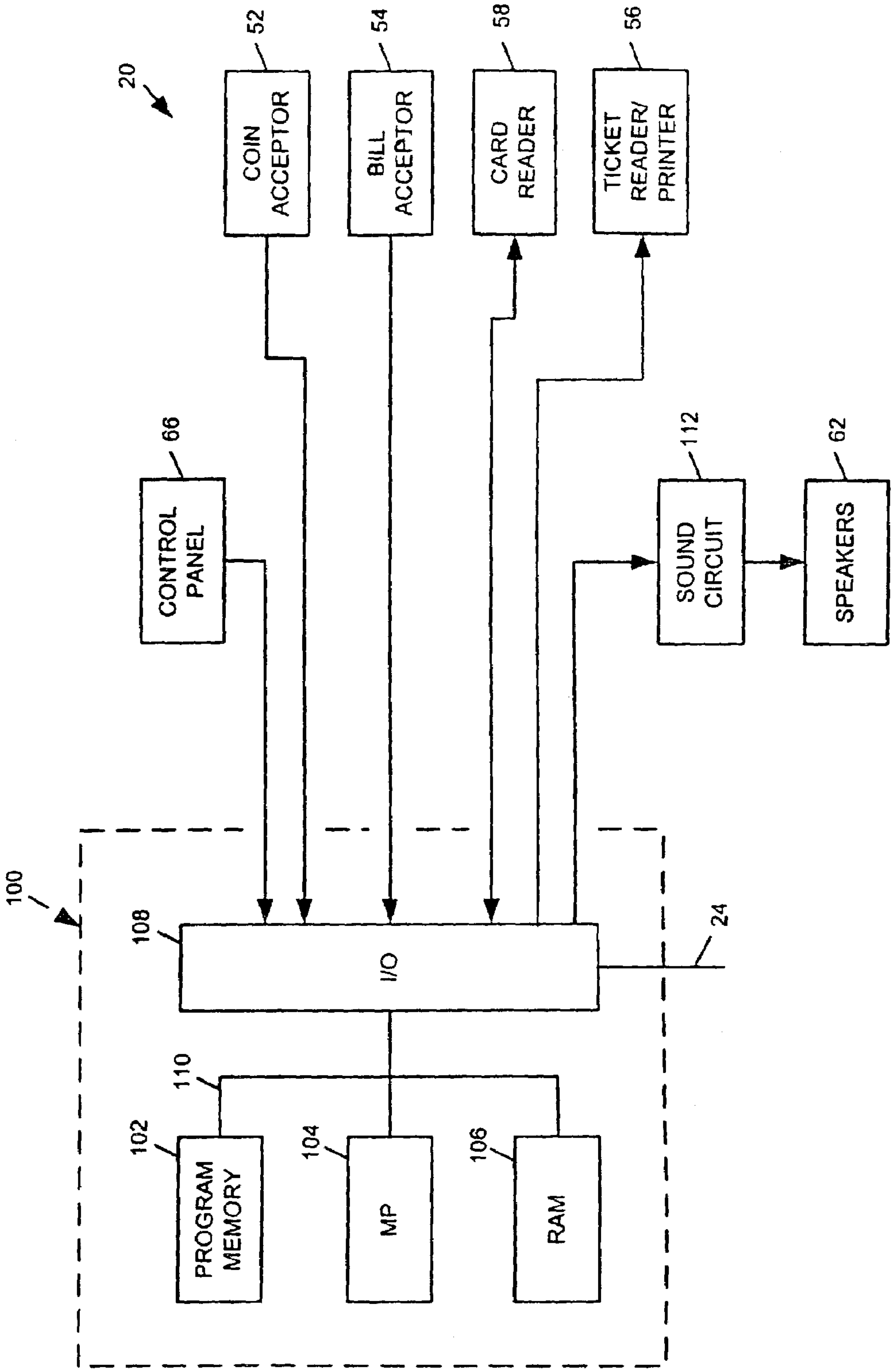
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
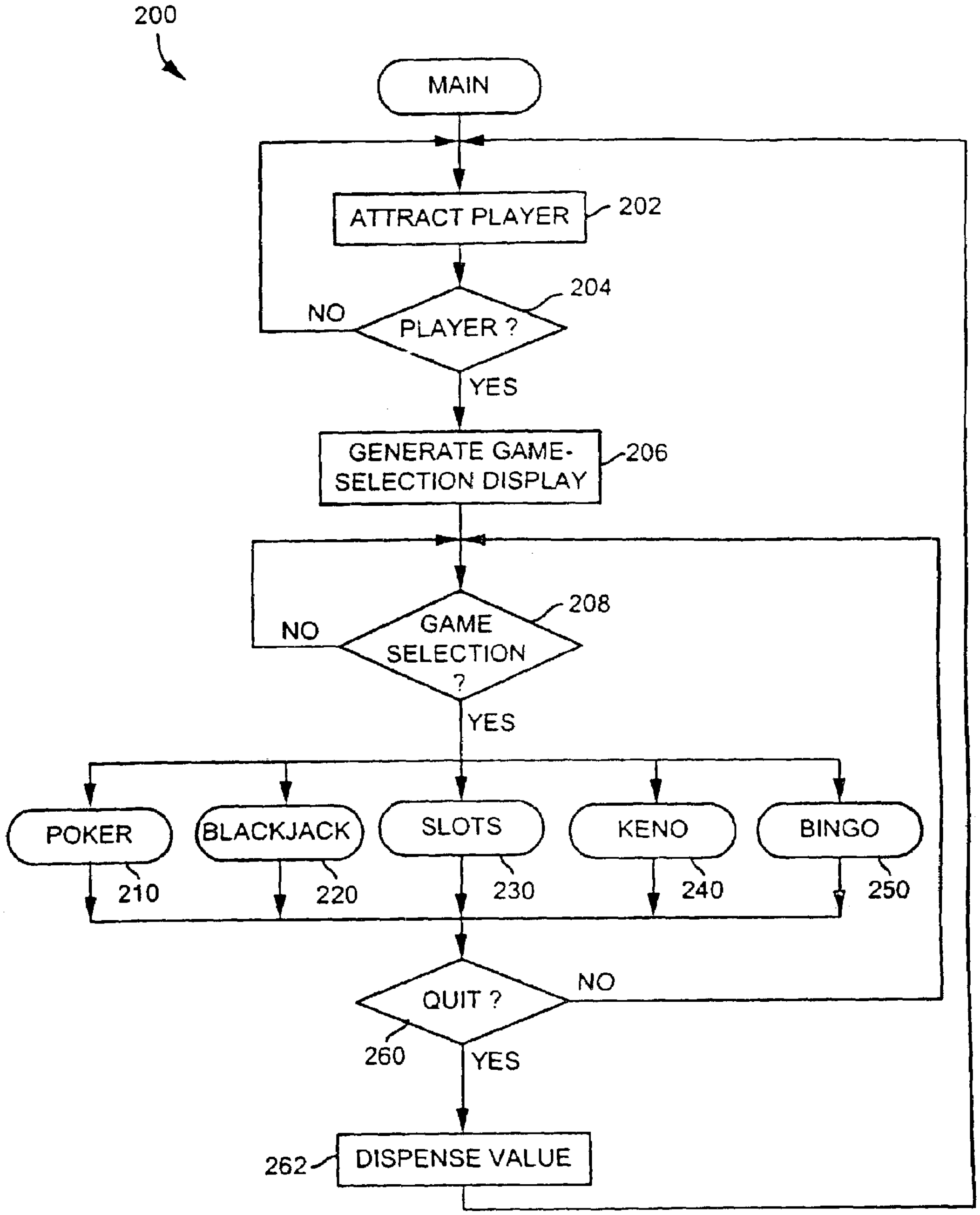
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
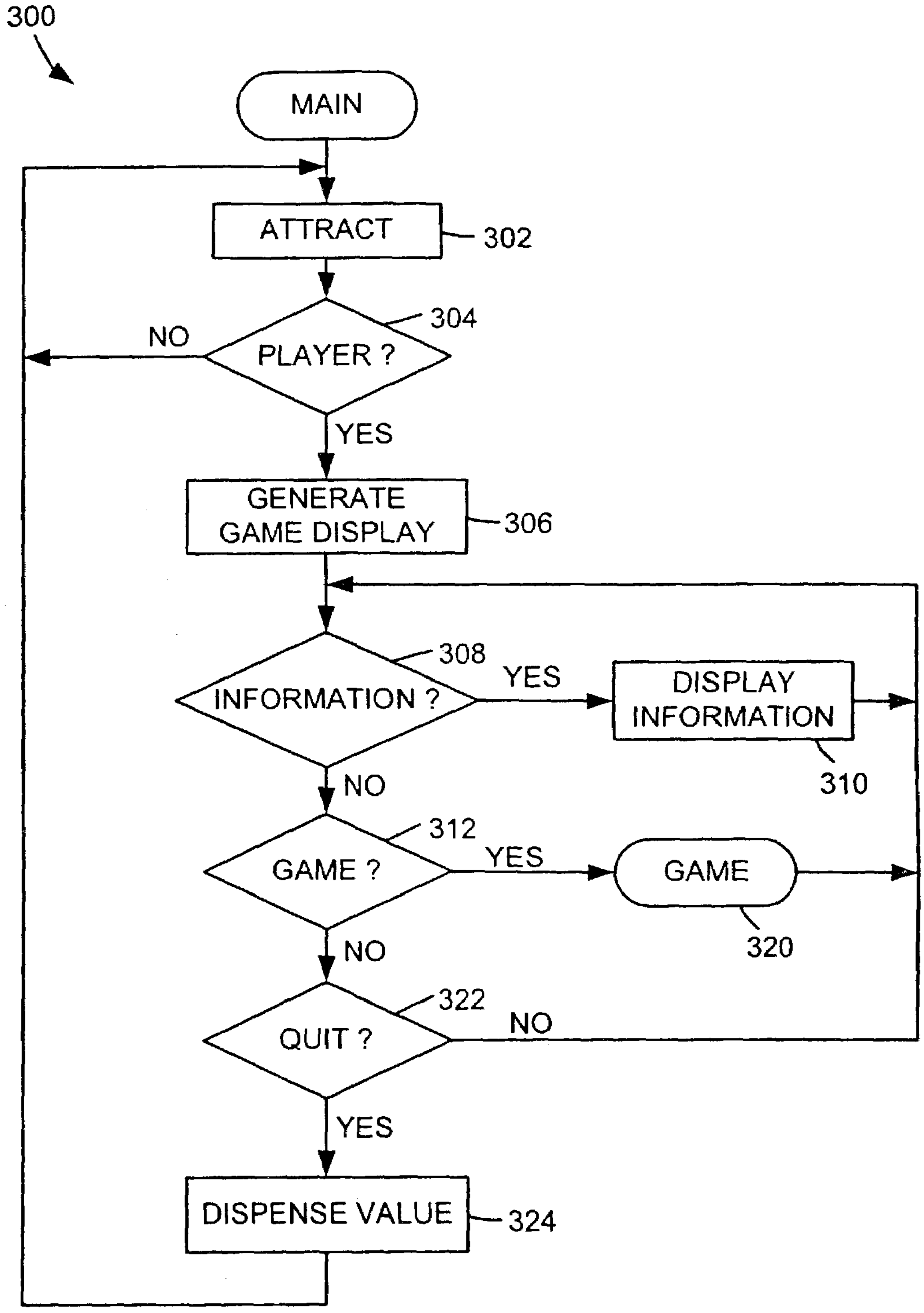
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 6:
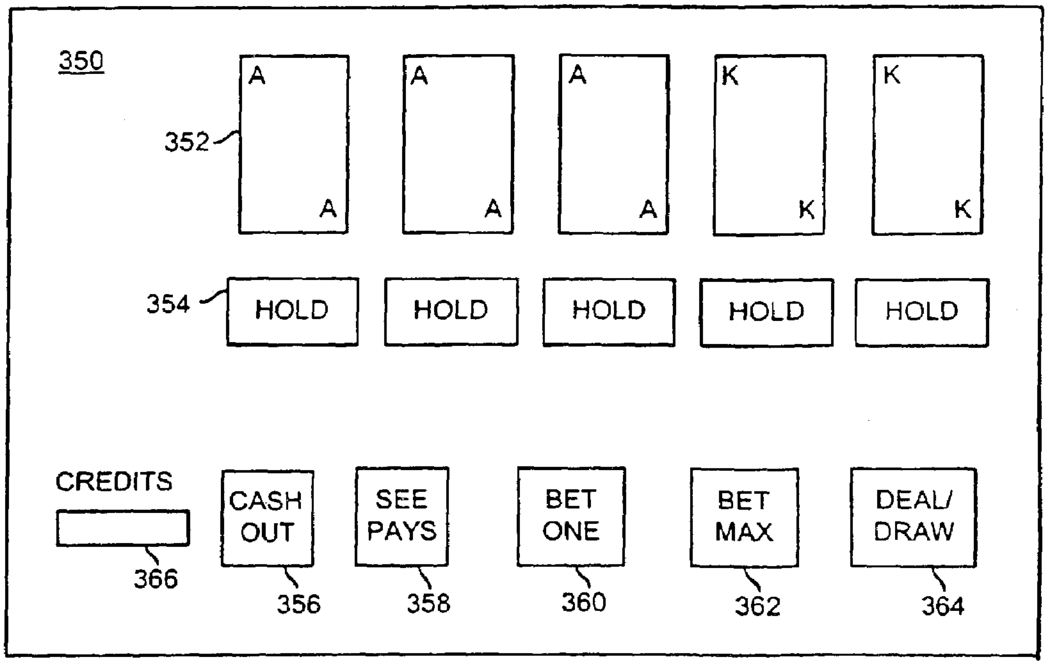
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. Alternatively, users may input their selections using the scanner 650. This enables the user to prepare their selections at the users convenience without having to wait for a game to start or for a gaming unit 20 to be available. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
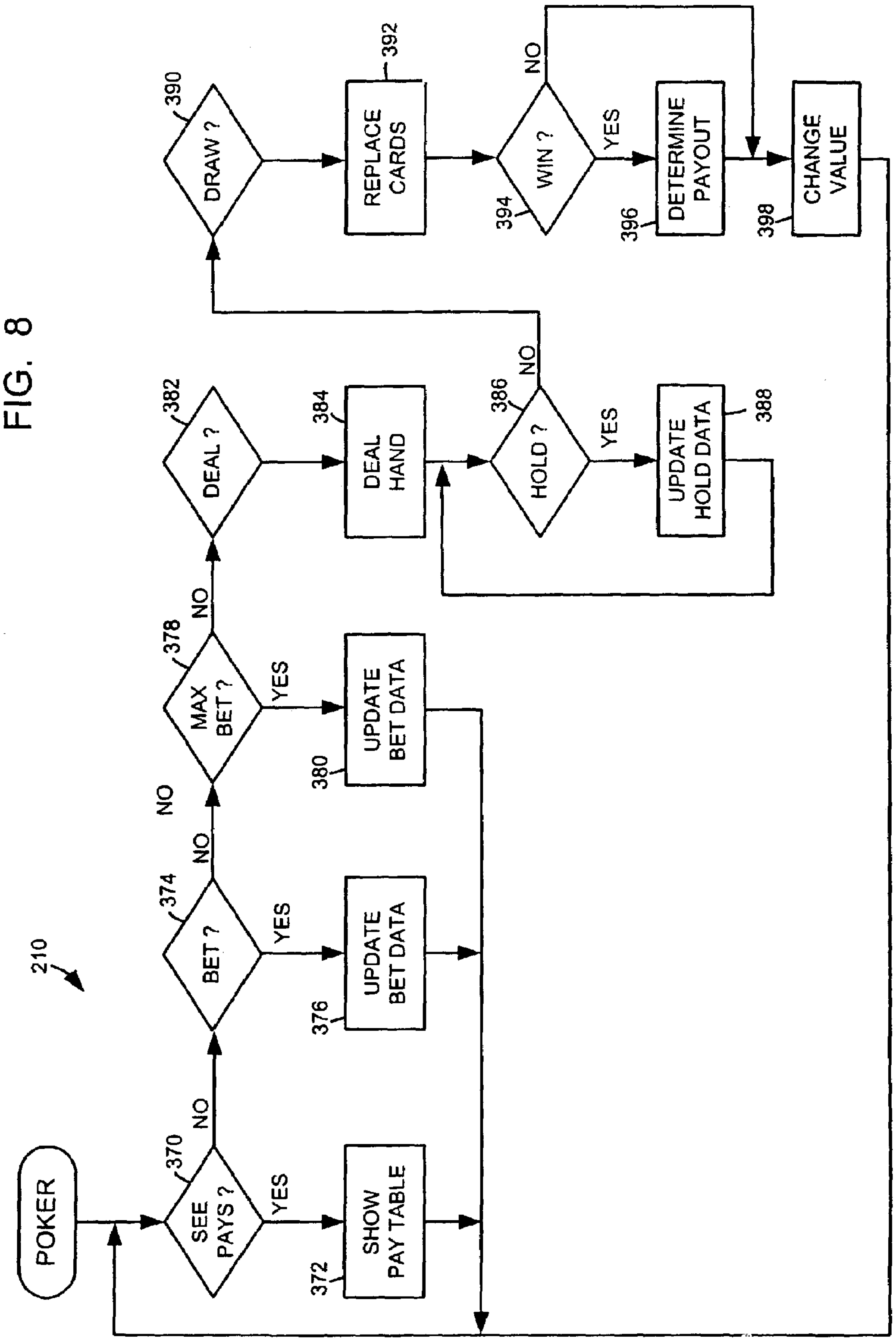
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
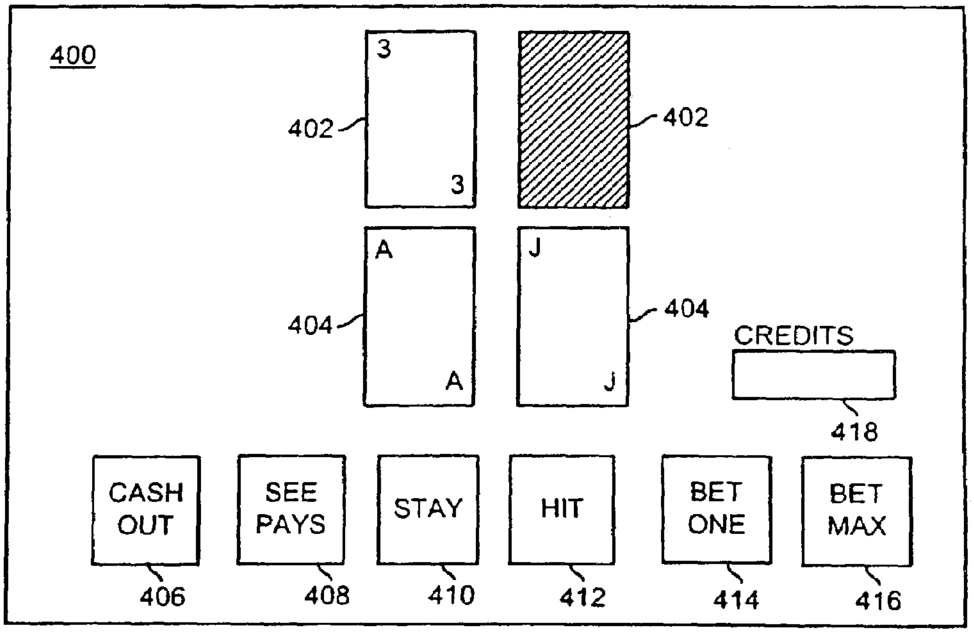
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. Alternatively, users may input their selections using the scanner 650. This enables the user to prepare their selections at the users convenience without having to wait for a game to start or for a gaming unit 20 to be available. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
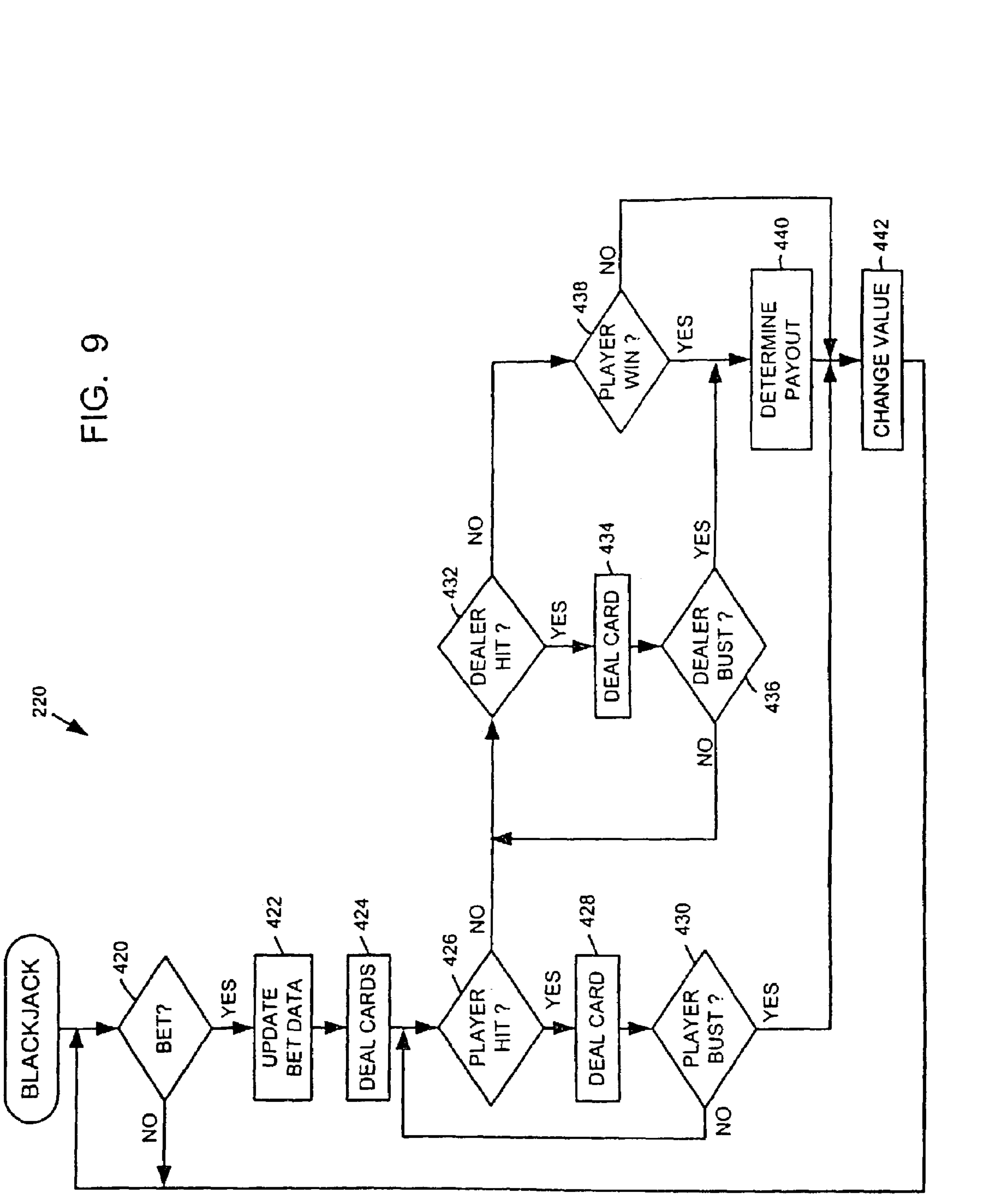
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable. Alternatively, users may input their selections using the scanner 650. This enables the user to prepare their selections at the users convenience without having to wait for a game to start or for a gaming unit 20 to be available.

Figure 12:
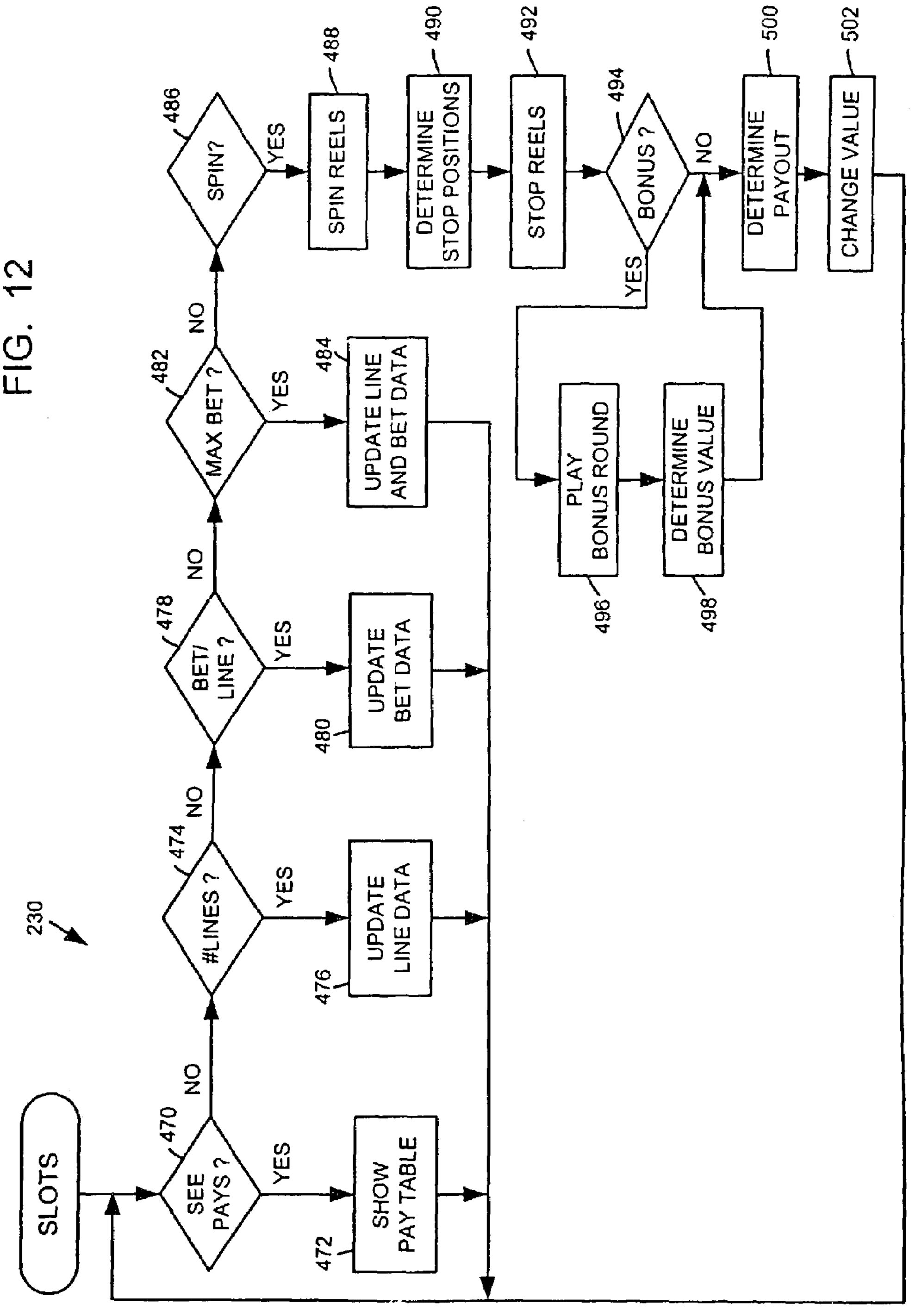
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. Alternatively, users may input their selections using the scanner 650. This enables the user to prepare their selections at the users convenience without having to wait for a game to start or for a gaming unit 20 to be available. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
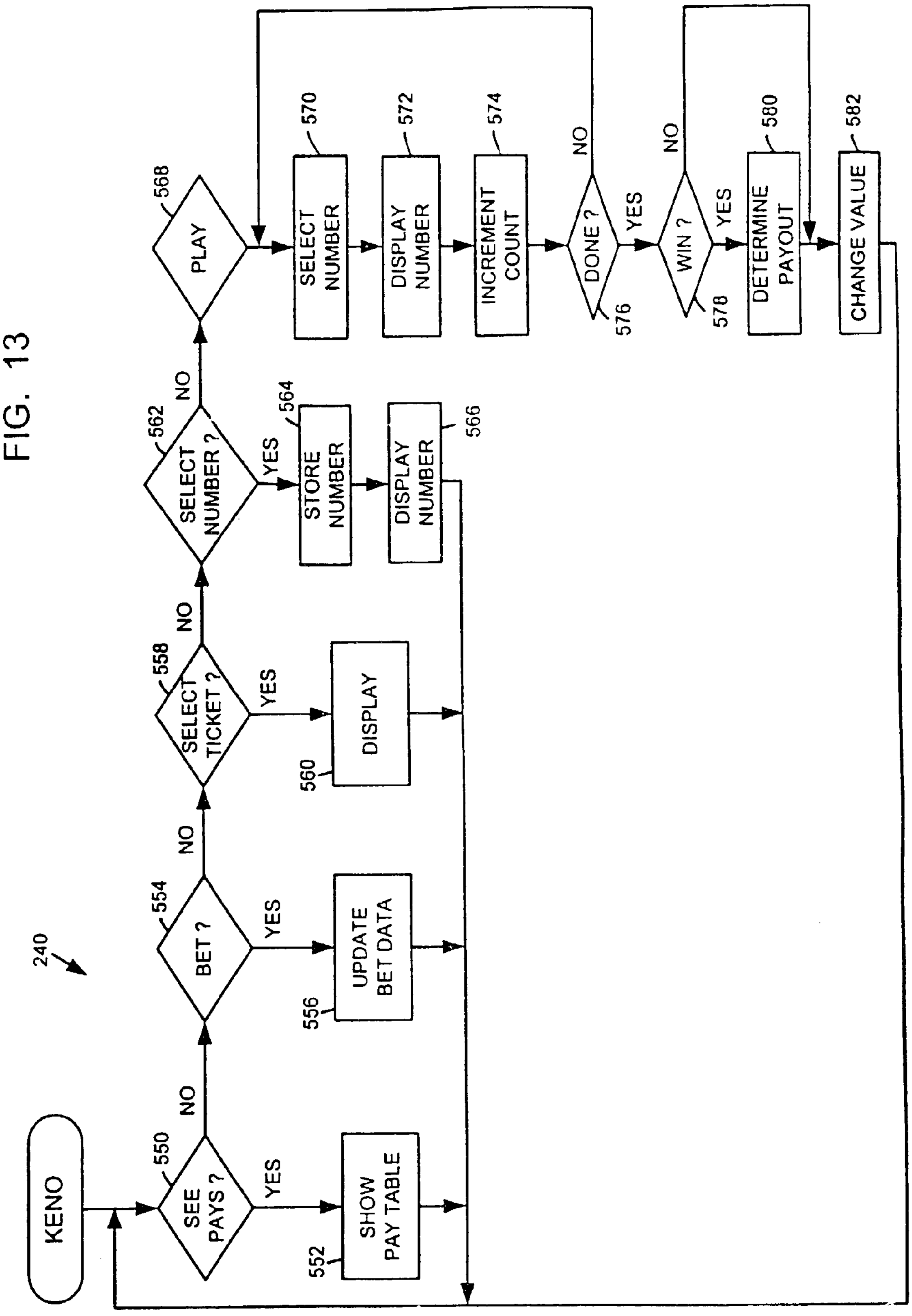
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
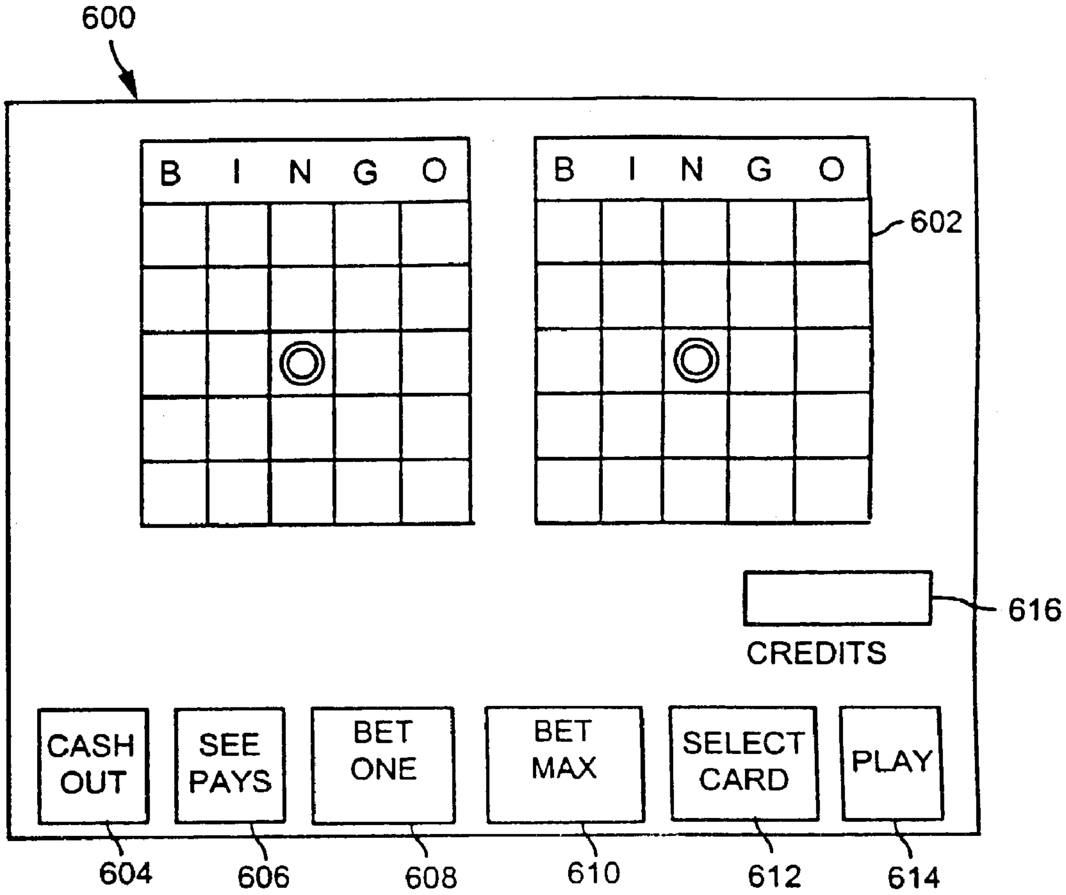
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. Alternatively, users may input their selections using the scanner 650. This enables the user to prepare their selections at the users convenience without having to wait for a game to start or for a gaming unit 20 to be available. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
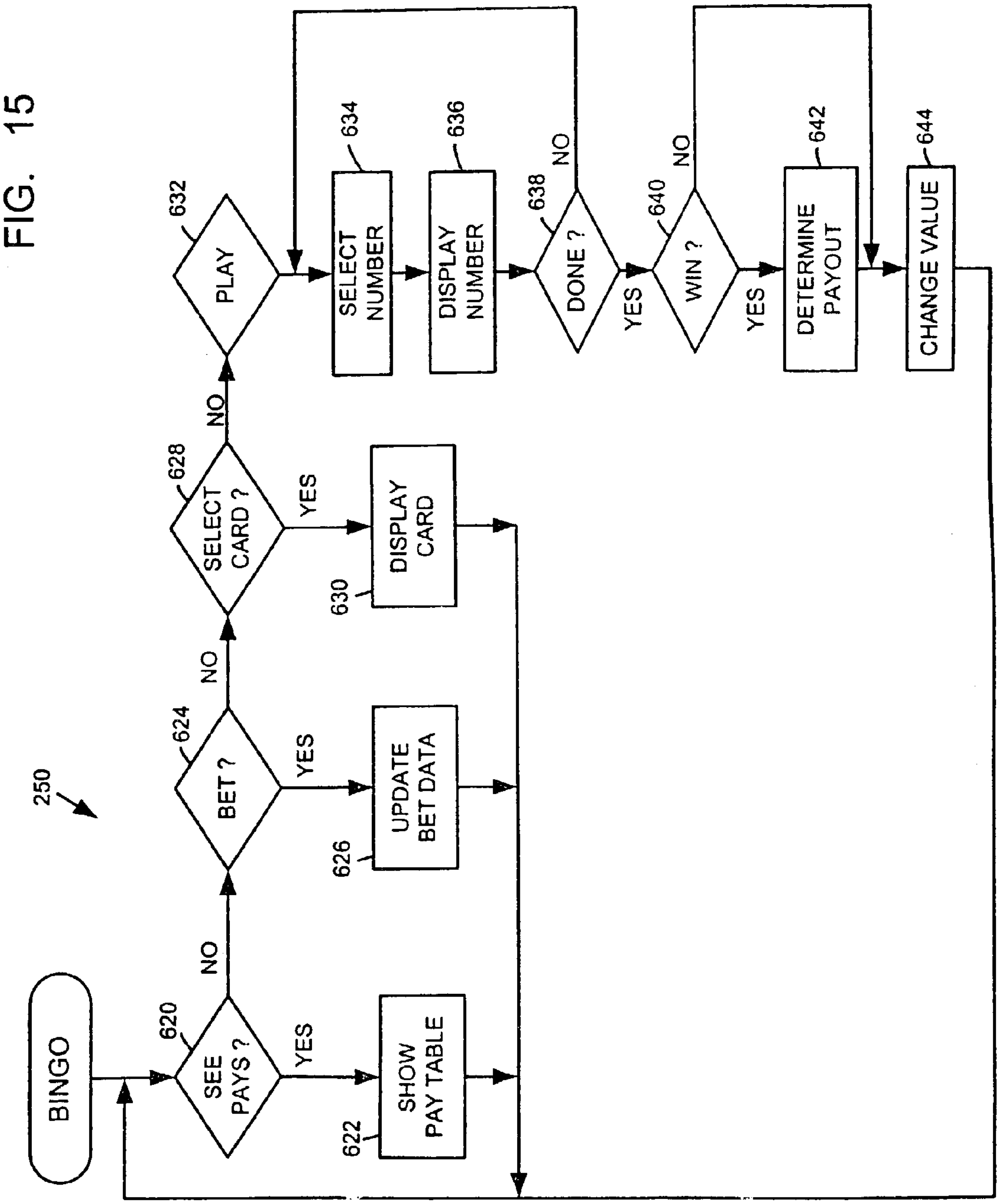
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Scanning Ability

Figure 16:
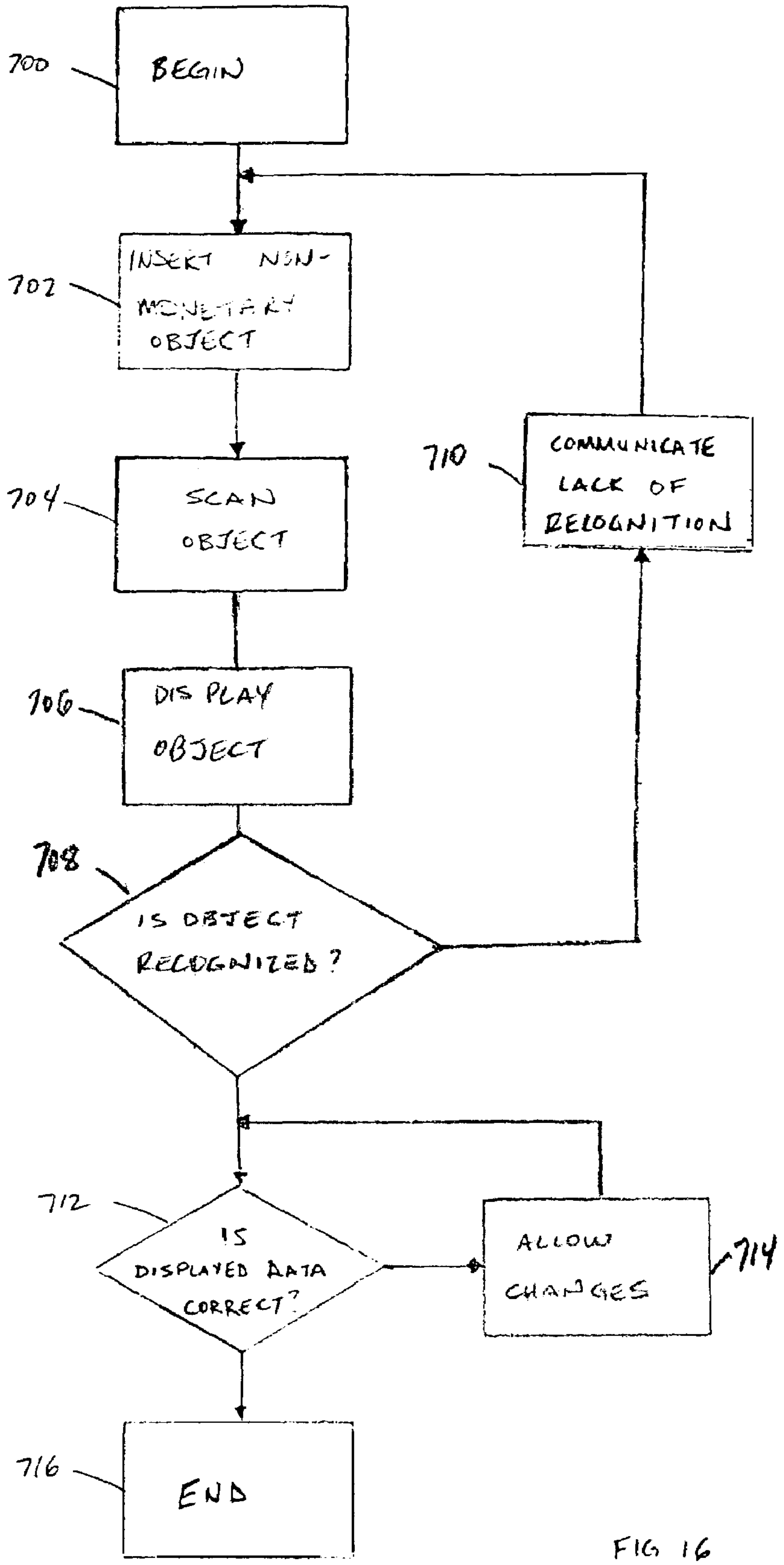
FIG. 16 is a flowchart of an embodiment of a scanning routine that may be performed by one or more of the gaming units.

FIG. 16 is a flowchart of a method of scanning an object 648 inserted into the gaming unit 20. The scanner 650 in the gaming machine may be a traditional value input device or scanner such as a paper currency acceptor 54 as sold by Japan Cash Machine, Mars Electronic Inc. or Ardac, may be the ticket reader/printer 56, may be the card reader 58 or may be a scanner 650 with increased functionality such as a scanner 650 that is traditionally attached to a personal computer such as a scanner 650 sold by Canon, Brother, Epson, Hewlett-Packered and the like.

Traditional gaming scanners 650 such as the paper currency acceptor 54 may scan three different spots on the object 648 inserted into the gaming unit 20. Accordingly, the scan provides data to the controller 100 from three different sensors as the inserted object 648 flows across the three sensors. The scanner 650 with additional functionality, for example, a personal computer type scanner 650 may be capable of scanning 1200 dots per inch of the object 648 that flows across it. Scanners 650 with higher dots per inch scanning capability are available and may also be used. As a result, the entire width of the object 648 may be scanned rather than three regions as in a traditional paper currency acceptor or gaming scanner 54 and the data of the scan of the width of the entire object 648 may be provided to the controller 100.

Referring again to FIG. 16, at block 700, the method begins. At block 702, the object 648 is inserted into the scanner 650 attached to the gaming unit 20. The scanner 650 may be a traditional paper currency acceptor 54 or the scanner 650 with additional functionality. At block 704, the object 648 inserted into the scanner 650 in the gaming unit 20 may be scanned by the scanner 650. The scanner 650 may transmit data representing a digital representation or scan 652 of the object 648 to the controller 100. The object 648 could be virtually any object 648 that will fit through the scanner 650. Example of objects 648 that may be inserted into the scanner 650 are credit cards, drivers licenses, keno bet slips, sports book bet slips, player tracking cards and the like. The bet slips may be formatted to be read by the traditional scanner 650 or may be bet slips that can be read by the scanner 650 with additional functionality. For example, the bet slip may be designed such that the choices made by the user will pass under the three sensors of a traditional scanner 650. In the alternative, the scanner 650 with increased functionality may read in virtually any object 648 containing communication so long as it is formatted to fit through the scanner 650.

The object 648 may be a preformatted form designed to assist the user complete a specific task. For example, the object 648 may be a preformatted form for a keno game. By preformatting the object 648, the gaming establishment can assist the user in providing all the required information. The user can see from the preformatted form that certain spaces must be filled in for the form to be properly entered. The use of check boxes and data entry fields will make it obvious to the user that certain information is required. As an example, a preformatted form could be created for betting on professional football where there would be a data entry field for the home team, a data entry field for the visiting team and check boxes next to each data entry field to indicate which team the user believes will be the winner against the spread. By using preformatted forms, optical character recognition is easier as the scanner 650 will know in advance the areas of the forms where the key information is located. Keno, bingo, sports book, membership applications, free drink coupons and the like may lend themselves to preformatted forms.

At block 706 the controller 100 may display the scan 652 of the object 648 on the display 70. At block 708, the controller 100 determines whether the scan 652 is recognized. The controller 100 may compare the digital data representing the scan 652 to digital data of other known acceptable objects 654 to determine if the scan 652 is recognized. From example, if a user inserts a stick of gum into the scanner 650, the controller 100 may compare the digital representation of the stick of gum 652 to other known digital representations 654. As the scan 652 of the stick of gum may not match another known scan 654, block 710 may communicate to the user that the object 648 is not recognized by, for example, displaying a message on the display 70 that the object 648 inserted into the scanner 650 does not match a known scan 654 or is not recognized and control may pass to block 702. The controller 100 may determine that the object is recognized if the digital data representing the scan 652 is determined to be similar to digital data representing acceptable object 654 such as drivers licenses, credit cards, player tracking cards, keno bet slips and the like.

A block 712 may ask the user whether the displayed scan 652 is correct. In some instances, a user may insert an object 648 into the scanner 650 that is dirty or partially obscured and block 712 will allow the user to approve or disapprove the scan 652 of the object 648. If the user disapproves of the scan 652 of the object 648, control may pass to block 714 where the user may be presented the option to modify the displayed scan 652 of the object 650. If the user approves of the display of the object 650, the controller 100 may store the digital information of the scan as an approved scan 656 and the method may end at block 716.

In addition, after the object 650 is scanned at block 704, the scan 652 may be subjected to an optical character recognition routine. Optical character recognition routines are well known and may evaluate the scanned image 652 and attempt to recognize known characters in the scan 652. Accordingly, the recognized characters may be treated as text with the characters being searchable and savable as text. In addition, the text may be tested against known databases to determine if the object 648 inserted in the scanner 650 on the gaming unit 20 is recognized. For example, if a credit card is inserted into the gaming unit 20, the credit card may be scanned, an optical character recognition routine may review the scan 652 and the text (including any numbers) from the credit card may be reviewed against known credit card databases to determine if the card is an acceptable credit card. The data may be stored as first identification data and second identification data. In addition the name on the credit card may be tested to determine that it accuracately matches the number on the card. As another example, if a user inserts a drivers license, the scanned in name may be stored as the first identification data and the license number may be stored as second identification data and both the scanned in name and license number may be checked against known databases to determine whether the license is accurate and should be authorized. As described in block 714, users of the gaming machine may have the opportunity to modify the text.

If the scan 652 is approved, the gaming unit 20 may perform a variety of routines based on the scan 652. If the scan 652 was of a bet slip, a bet on a particular event may be entered. For example, a user may place a bet that the Chicago Bears may beat the Green Bay Packers by more than 7 points (the spread) by selecting a box on a bet slip that is read by the scanner 650, approved by the user and entered into the sport book at a casino. Similarly, a keno card may be read into the system through the scanner 650 and a player may be entered into a keno game based on the keno card scan 652.

The routine also may allow the user to apply for a player tracking card. By scanning in a drivers license, for example, the system may be able to gather sufficient data to automatically have the user apply for a player tracking card. In addition, block 714 may allow the user to add additional information that may be needed to complete the player tracking card application. The system may also be able to use the data from the scanned in object to research known databases to fill in further information on the player tracking application. For example, if a credit card is scanned, the name and credit card number may be entered into a database of credit card numbers and names and the relevant address of the credit card holder may be filled in on the application.

The routine may allow the user to collect player tracking points. For example, if a player forgot a player tracking card or prefers not to carry one, a player may scan in his drivers license instead. The system may then match the scanned data from the drivers license to the data in the player tracking database and the system may access the player tracking account of the player without having the player insert his player tracking card.

The gaming unit 20 also may be able to redeem winning bet slips including bet receipts from the sport book itself. For a player may have won a wager on sporting event on a bet he placed at the sport book. The player may be able to insert the receipt from the sports book into the gaming unit scanner 650 and gain credits on the gaming unit 20 based on the sports book receipt.

The gaming unit 20 also may be able to arrange other service that a casino may offer. For example, a casino may offer shows, concerts, circuses, shopping, aquariums, roller coasters, spas, sports, sporting events, restaurants, clubs and bars to entice customers. Users may be able to write down a request and insert it into the scanner 650 where the request will proceed through the blocks in FIG. 16, except that the object 648 will be a request to see a show, for example, rather than play keno.

A printout may be created to memorialize the transaction. For example, sports books normally hand a player a receipt when a bet is placed and this receipt is used to collect winnings if the player is a winner. A similar receipt may be printed when a player places a bet through the gaming system. In addition, the gaming system may produce a cashless gaming voucher such as an EZ Pay stub which may be redeemed at another station.

Figure 17:
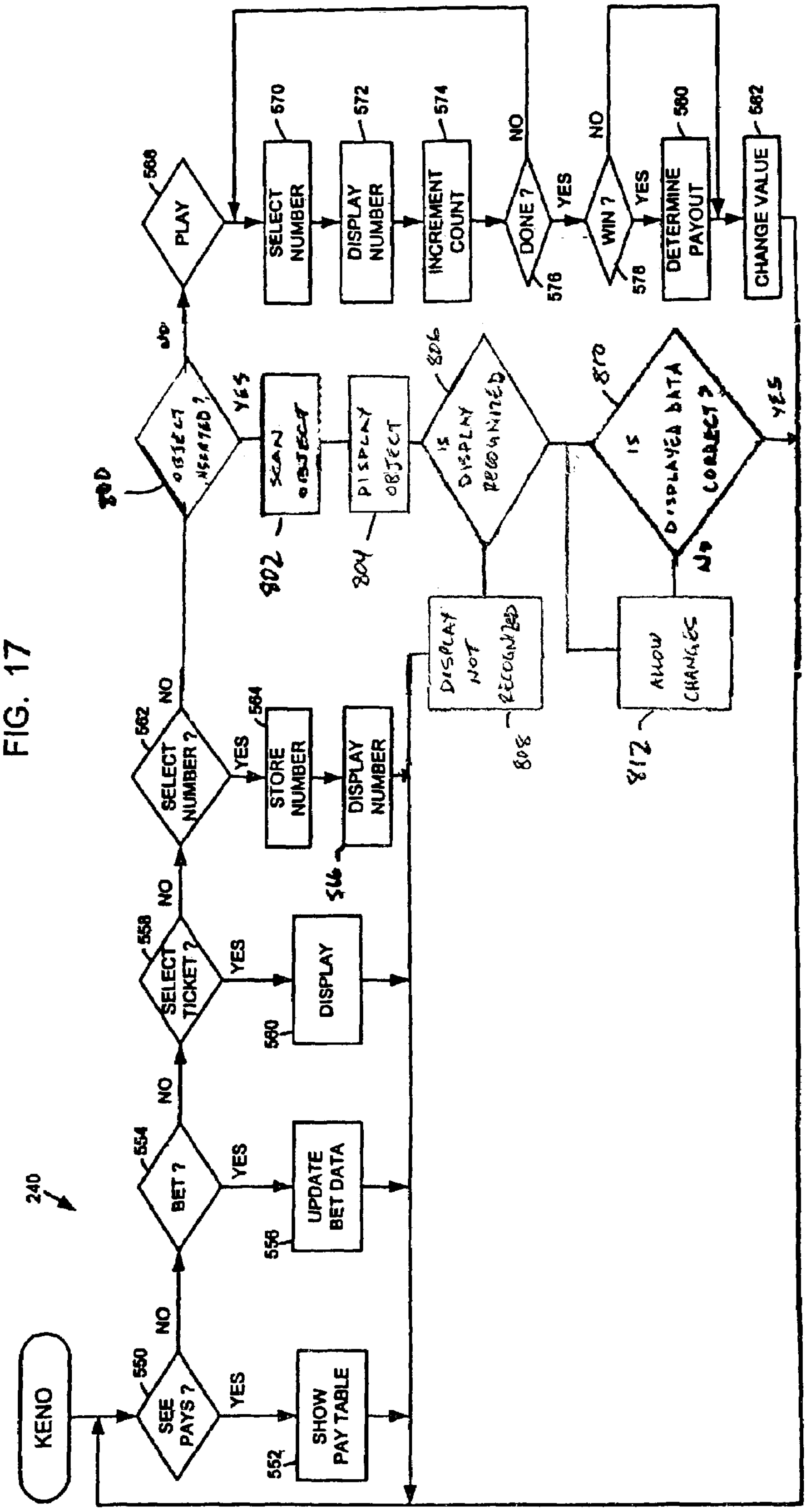
FIG. 17 is a flowchart of an embodiment of a video keno routine including a scanning routine that may be performed by one or more of the gaming units.

FIG. 17 illustrates a modified version of Keno with scanning capability. It is very similar to FIG. 13, with additional blocks 800 through 812 added and the blocks 550 through 582 are similar to those described in relation to FIG. 13. At block 800, the gaming unit determines whether an object has been inserted into the scanner. If an object has been inserted, at block 802, the object will be scanned. At block 804, the controller 100 may display the scan 652 of the object 648 on the display 70. At block 806, the controller 100 determines whether the scan 652 is recognized. The controller 100 may compare the digital data representing the scan 652 to digital data of other known acceptable objects 654 to determine if the scan 652 is recognized. For example, the controller 100 may compare the digital data representing the scan 652 to the digital data of known keno forms such as preformatted keno forms. Block 808 may communicate to the user that the object 648 is not recognized by, for example, displaying a message on the display 70 that the object 648 inserted into the scanner 650 does not match a known scan 654 or is not recognized and control may pass to block 550. The controller 100 may determine that the object is recognized if the digital data representing the scan 652 is determined to be similar to digital data representing acceptable object 654 such as a preformatted keno bet slip.

A block 810 may ask the user whether the displayed scan 652 is correct or if any needed information is missing. For example, a user may select numbers to be played in a keno game but the user may forget to specify the amount of the bet and this may be indicated on the display 70. If the user disapproves of the scan 652 of the object 648, control may pass to block 812 where the user may be presented the option to modify the displayed scan 652 of the object 650. If the user approves of the display of the object 650, the controller 100 may store the digital information of the scan as an approved scan 656 and the method may return to block 550 and the method continues as described in relation to FIG. 13. The approved scan can then be transmitted through the network 40 and the player can participate in a network wide keno game.

Figure 18:
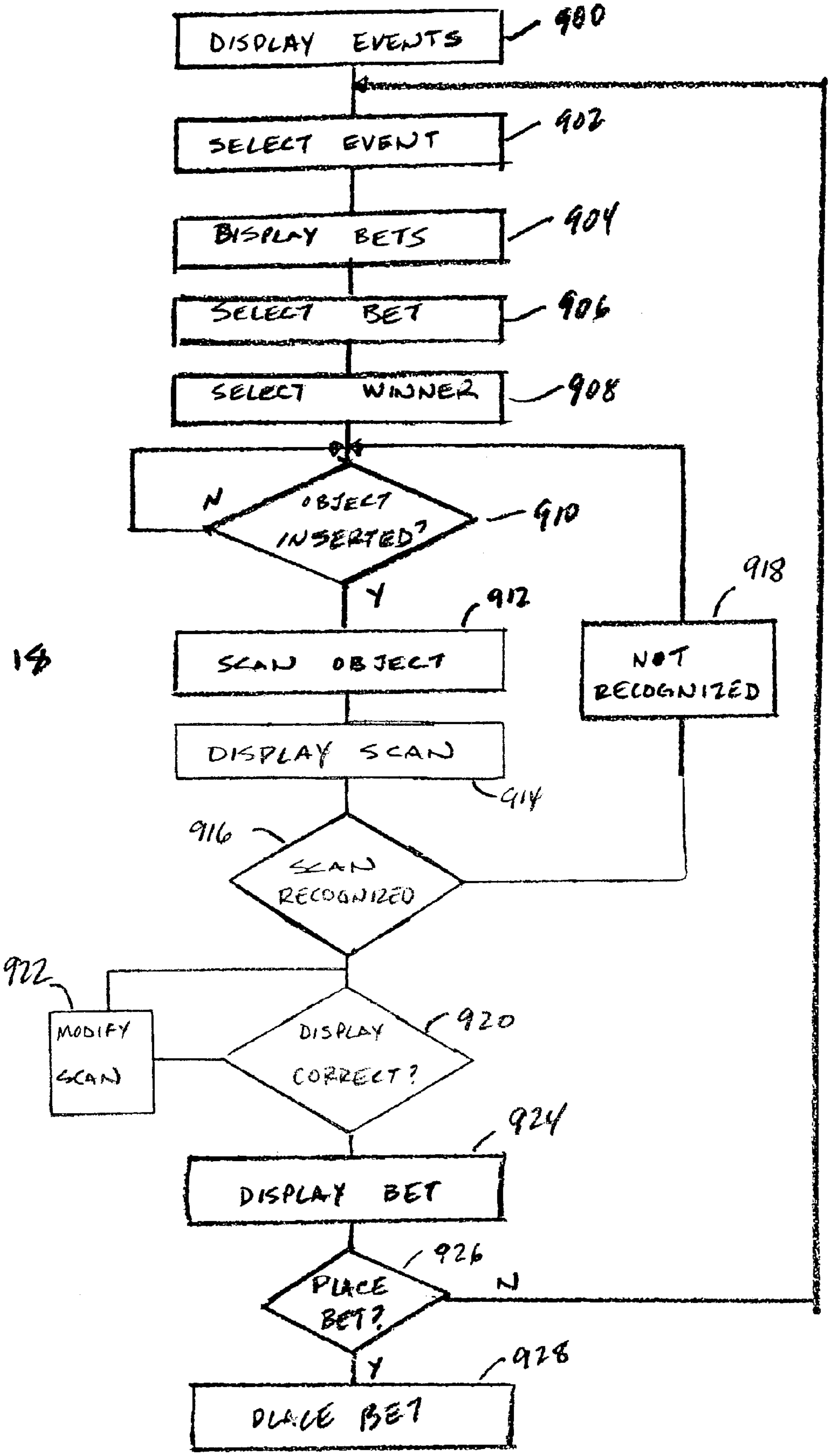
FIG. 18 is a flowchart of an embodiment of a sportsbook routine including a scanning routine that may be performed by one or more of the gaming units.

FIG. 18 is another example of the system, this time applied to sports book. At block 900, the controller may display on the display device 70 all the events available for betting. The events may be separated by sport, such as football games, baseball games, horse races, etc. At block 902, the user may select an event on which to bet. At block 904, the controller may display on the display device 70 all the available bets on the event selected. For example, in a football game, a user may be able to bet on the winner in view of a point spread or the user may be able to bet on the total number of points that will be scored in the football game. Many other types of bets are available and are understood by one skilled in the art. At block 906, the user may select a type of bet. At block 908, the user can select a side of the bet. For example, in a football game bet, the user will select one team or the other with respect to the spread or the number of points by which one team is favored.

At step 910, the gaming unit 10 determines whether an object has been inserted into the scanner. If an object has been inserted, at block 912, the object will be scanned. At block 914, the controller 100 may display the scan 652 of the object 648 on the display 70. At block 916, the controller 100 determines whether the scan 652 is recognized. The controller 100 may compare the digital data representing the scan 652 to digital data of other known acceptable objects 654 to determine if the scan 652 is recognized. For example, the controller 100 may compare the digital data representing the scan 652 to the digital data of known sportsbooks forms. Block 918 may communicate to the user that the object 648 is not recognized by, for example, displaying a message on the display 70 that the object 648 inserted into the scanner 650 does not match a known scan 654 or is not recognized and control may pass to block 550. The controller 100 may determine that the object is recognized if the digital data representing the scan 652 is determined to be similar to digital data representing acceptable object 654 such as a preformatted sports bet slip.

A block 920 may ask the user whether the displayed scan 652 is correct or if any needed information is missing. For example, a user may select teams in a football game but the user may forget to specify the amount of the bet and this may be indicated on the display 70. If the user disapproves of the scan 652 of the object 648, control may pass to block 922 where the user may be presented the option to modify the displayed scan 652 of the object 650. If the user approves of the display of the object 650, the controller 100 may store the digital information of the scan as an approved scan 656. At block 924, the controller 100 may display the bet as currently selected. At block 926, the user will have the option of placing the bet or canceling the bet. If the user cancels the bet, control may pass to block 902. If the user selects to place the bet, at block 928 the bet may be communicated to the sportsbook via the network 40. Other casino games can be modified in a similar manner to use the scanner with increased functionality.

What is claimed is:

1. A gaming apparatus, comprising:

a display unit that is capable of generating video images;

an input device;

a controller operatively coupled to said display unit and said input device, said controller comprising a processor and a memory operatively coupled to said processor, said controller being programmed to allow a player to insert an object into the input device;

said controller being programmed to cause the input device to scan an image of the object;

said controller being programmed to save the scan of the object to a memory;

said controller being programmed to display the scan of the object;

said controller being programmed to determine if the scan of the object is recognized;

said controller being programmed to communicate to the player that the object is not recognized if the scan of the object is not recognized;

said controller being programmed to allow the player to modify the scan of the object if the scan of the object is recognized;

said controller being programmed to allow the player to approve the scan of the object if the scan of the object is recognized; and said controller being programmed to store the scan of the object as approved by the player as an approved scan in a memory if the player approves the scan of the object.

2. The gaming apparatus as defined in claim 1, wherein the object is selected from the group of objects consisting of a preformatted bet slip, an unformatted bet slip, a preformatted keno form, a drivers license, a credit card and a casino membership benefit card.

3. The gaming apparatus as defined in claim 1, wherein the controller is programmed to recognize the object by comparing the scan of the object to an image of known state drivers license images.

4. The gaming apparatus as defined in claim 1, wherein the controller is programmed to recognize the object by comparing the image of the scan to known bet paper.

5. The gaming apparatus as defined in claim 1, wherein the input device is an optical scanner.

6. The gaming apparatus as defined in claim 1, wherein the controller is programmed to submit a bet based on the approved scan.

7. The gaming apparatus as defined in claim 1, wherein the controller is programmed to submit a player card application based on the approved scan.

8. The gaming apparatus as defined in claim 1, wherein the controller is further programmed to distribute player points to the player based on the approved scan.

9. The gaming apparatus as defined in claim 1, wherein the controller is further programmed to submit an entry into a keno game based on the approved scan.

10. The gaming apparatus as defined in claim 1, wherein the controller executes an optical character recognition routine on the scan of the object wherein the controller stores characters recognized by the optical character routine in a memory.

11. The gaming apparatus as defined in claim 10, wherein the controller is programmed to compare the stored characters to a database to determine if the object is authorized.

12. The gaming apparatus as defined in claim 10, wherein the controller is programmed to compare the stored characters to a database of authorized drivers license numbers to determine if the object is authorized.

13. The gaming apparatus as defined in claim 10, wherein the controller is programmed to compare the stored characters to a database of authorized credit card numbers to determine if the object is authorized.

14. The gaming apparatus as defined in claim 10, wherein the controller is programmed to distinguish stored characters into first identification data and second identification data.

15. The gaming apparatus as defined in claim 14, wherein the controller is programmed to compare the first identification data and second identification data to a database to determine if the object is authorized.

16. A gaming apparatus, comprising:

a display unit that is capable of generating video images;

an input device;

a controller operatively coupled to said display unit and said input device, said controller comprising a processor and a memory operatively coupled to said processor, said controller being programmed to allow a player to insert a object into the input device;

said controller being programmed to cause the input device to scan an image of the object;

said controller being programmed to save the scan of the object to a memory;

said controller being programmed to display the scan of the object;

said controller being programmed to execute an optical character recognition routine on the scan of the object wherein the controller stores characters recognized by the optical character routine in a memory;

said controller being programmed to determine if the scan of the object is recognized;

said controller being programmed to communicate to the player that the object is not recognized if the scan of the object is not recognized;

said controller being programmed to display the recognized characters if the scan of the object contains recognizable characters;

said controller being programmed to allow the player to modify the scan of the image if the scan of the object is recognized;

said controller being programmed to allow the player to modify the recognized characters if the scan of the object contains recognizable characters;

said controller being programmed to allow the player to approve the scan of the object if the scan of the object is recognized;

said controller being programmed to allow the player to approve the recognized characters if the scan of the object contains recognizable characters;

said controller being programmed to store the scan of the object as approved by the player as an approved scan in a memory if the player approves the scan of the object; and said controller being programmed to store the recognized characters as approved by the player as approved characters in a memory if the player approves the recognized characters.

17. The gaming apparatus as defined in claim 16, wherein the object is selected from the group of objects consisting of a preformatted bet slip, an unformatted bet slip, a preformatted keno form, a drivers license, a credit card and a casino membership benefit card.

18. The gaming apparatus as defined in claim 16, wherein the controller is programmed to recognize the object by comparing the scan of the object to the image of known state drivers license images.

19. The gaming apparatus as defined in claim 16, wherein the controller is programmed to recognize the object by comparing the scan of the object to known bet paper.

20. The gaming apparatus as defined in claim 16, wherein the controller is programmed to compare the stored characters to a database to determine if the object is authorized.

21. The gaming apparatus as defined in claim 16, wherein the controller is compared to distinguish stored characters into first identification data and second identification data.

22. The gaming apparatus as defined in claim 16, wherein the controller is programmed to compare the first identification data and second identification data to a database to determine if the object is authorized.

23. The gaming apparatus as defined in claim 16, wherein the controller is programmed to compare the stored characters to a database of authorized drivers license numbers to determine if the object is authorized.

24. The gaming apparatus as defined in claim 16, wherein the controller is programmed to compare the stored characters to a database of authorized credit card numbers to determine if the object is authorized.

25. The gaming apparatus as defined in claim 16, wherein the input device is an optical scanner.

26. The gaming apparatus as defined in claim 16, wherein the controller is programmed to submit a bet based on the approved scan.

27. The gaming apparatus as defined in claim 16, wherein the controller is programmed to submit a player card application based on the approved scan.

28. The gaming apparatus as defined in claim 16, wherein the controller is further programmed to distribute player points to the player based on the approved scan.

29. The gaming apparatus as defined in claim 16, wherein the controller is further programmed to submit an entry into a keno game based on the approved scan.

30. A gaming method comprising:

inserting an object into a scanner on a gaming unit;

scanning the object inserted into the scanner to create a scan of the object;

displaying the scan of the object;

determining whether the scan of the object is similar to a scan of a known object;

communicating to a user that the scan of the object is not similar to a scan of a known object if the scan of the object is determined not to be similar to a scan of a known object;

allowing the user to determine whether the displayed scan of the object is satisfactory;

allowing the user to modify the displayed scan of the object if the user determines the scan of the object is not satisfactory; and storing the scan of the object in a memory as an approved scan if the user determines the scan of the object is satisfactory.

31. A gaming method as defined in claim 30, additionally comprising inserting into the scanner the object selected from the group of objects consisting of a bet slip, a keno form, a drivers license, a credit card and a casino membership benefit card.

32. A gaming method as defined in claim 30, additionally comprising determining whether the scan of the object is similar to a known drivers license.

33. A gaming method as defined in claim 30, additionally comprising determining whether the scan of the object is similar to a known credit card.

34. A gaming method as defined in claim 30, additionally comprising determining whether the scan of the object is similar to a known casino member benefit card.

35. A gaming method as defined in claim 30, additionally comprising placing a bet based on the approved scan.

36. A gaming method as defined in claim 30, additionally comprising submitting a player card application based on the approved scan.

37. A gaming method as defined in claim 30, additionally comprising distributing player points to the user based on the approved scan.

38. A gaming method as defined in claim 30, additionally comprising submitting an entry into a keno game based on the approved scan.

39. A gaming method as defined in claim 30, additionally comprising executing an optical character recognition routine on the scan of the object and storing the characters recognized by the optical character routine in a memory.

40. A gaming method as defined in claim 39, additionally comprising comparing the stored characters to a database to determine if the object is authorized.

41. A gaming method as defined in claim 39, additionally comprising comparing the stored characters to a database of authorized credit card numbers to determine if the object is authorized.

42. A gaming method as defined in claim 39, additionally comprising comparing the stored characters to a database of drivers license names and numbers to determine if the object is authorized.

43. A memory having a computer program stored therein, said computer program being capable of being used in connection with a gaming apparatus, said memory comprising:

a first memory portion physically configured in accordance with computer program instructions that would cause the gaming apparatus to allow a user to insert an object into a scanner on a gaming unit;

a second memory portion physically configured in accordance with computer program instructions that would cause the gaming apparatus to scan the object inserted into the scanner to create a scan of the object;

a third memory portion physically configured in accordance with computer program instructions that would cause the gaming apparatus to determine whether the scan of the object is similar to a scan of a known object;

a fourth memory portion physically configured in accordance with computer program instructions that would cause the gaming apparatus to communicate to the user that the scan of the object is not similar to a scan of a known object if the scan of the object is determined not to be similar to a scan of a known object;

a fifth memory portion physically configured in accordance with computer program instructions that would cause the gaming apparatus to display the scan of the object if the scan of the object is determined to be similar to a scan of a known object;

a sixth memory portion physically configured in accordance with computer program instructions that would cause the gaming apparatus to allow the user to determine whether the displayed scan of the object is satisfactory;

a seventh memory portion physically configured in accordance with computer program instructions that would cause the gaming apparatus to allow the user to modify the displayed scan of the object if the user determines the scan of the object is not satisfactory; and an eighth memory portion physically configured in accordance with computer program instructions that would cause the gaming apparatus to store the scan of the object in a memory as an approved scan if the user determines the scan of the object is satisfactory.

44. A memory as defined in claim 43, wherein said memory additionally comprises an additional portion physically configured in accordance with computer program instructions that would cause the gaming apparatus to allow the user to insert into the scanner as the object an item selected from the group of: a drivers license, a credit card, a casino membership card, a bet slip and a keno playing card.

45. A memory as defined in claim 43, wherein said memory additionally comprises an additional portion physically configured in accordance with computer program instructions that would cause the gaming apparatus to determine whether the scan of the object is similar to one of the group of: a drivers license, a credit card, a player membership card, a bet slip and a keno playing card.

46. A memory as defined in claim 43, wherein said memory additionally comprises an additional portion physically configured in accordance with computer program instructions that would cause the gaming apparatus to perform an optical character recognition routine on the scan of the object and to save the recognized characters in an additional memory.

47. A memory as defined in claim 43, wherein said memory additionally comprises an additional portion physically configured in accordance with computer program instructions that would cause the gaming apparatus to compare the stored characters to a database selected from the group of: a database of drivers license numbers, a database of drivers license names, a database of credit card numbers, a database of drivers database credit card names, a database of casino membership holders and a database of casino membership numbers.

48. A memory as defined in claim 43, wherein said memory additionally comprises an additional portion physically configured in accordance with computer program instructions that would cause the gaming apparatus to place a bet based on the approved scan.

49. A memory as defined in claim 43, wherein said memory additionally comprises an additional portion physically configured in accordance with computer program instructions that would cause the gaming apparatus to enter a keno game based on the approved scan.

50. A memory as defined in claim 43, wherein said memory additionally comprises an additional portion physically configured in accordance with computer program instructions that would cause the gaming apparatus to submit an application for a casino membership based on the approved scan.

51. A memory as defined in claim 43, wherein said memory additionally comprises an additional portion physically configured in accordance with computer program instructions that would cause the gaming apparatus to assign casino tracking points based on the approved scan.

* * * * *